United States Patent [19]
Sadler et al.

[11] 3,806,287
[45] Apr. 23, 1974

[54] SHAFT SEAL FOR ROTATING PUMPS
[75] Inventors: Harry J. Sadler, St. Paul; John Leschisin, Minneapolis, both of Minn.
[73] Assignee: Lear Siegler, Inc., Santa Monica, Calif.
[22] Filed: June 20, 1972
[21] Appl. No.: 264,484

Related U.S. Application Data
[63] Continuation-in-part of Ser. No. 90,957, Nov. 19, 1970, abandoned.

[52] U.S. Cl. ................................ 418/225, 277/92
[51] Int. Cl. ............................................ F01c 1/00
[58] Field of Search ...................... 418/225; 277/92

[56] References Cited
UNITED STATES PATENTS

| | | | |
|---|---|---|---|
| 3,477,377 | 11/1969 | Sadler | 418/225 |
| 3,171,357 | 3/1965 | Egger | 415/170 A |
| 2,299,395 | 10/1942 | Karlberg | 277/92 |
| 2,245,106 | 6/1941 | Karlberg | 277/92 |
| 2,666,394 | 1/1954 | Sadler et al. | 418/225 |
| 2,745,687 | 5/1956 | Stack | 415/170 A |

Primary Examiner—C. J. Husar

[57] ABSTRACT

An improved seal for a roller pump having a rotor and a housing therefor, the axis of the rotor being offset from the axis of the housing so as to form a pumping chamber therein, the housing having porting formed along the end or side walls thereof so as to accommodate fluid flow therethrough. The rotor is provided with a shaft journaled in bearings to provide a support base therefor for controlling and permitting axial rotation of the shaft within the housing. The shaft seal comprises a sleeve element arranged coaxially about the surface of the shaft, the exterior of the sleeve element having a lip seal running circumferentially thereabout. The axial end of the sleeve element is provided with a radially outwardly extending chamfer zone so as to accommodate an O ring seal between the outer periphery of the shaft and the inner periphery of the sleeve. Preferably, the O ring seal is disposed along the rotor shaft at a point adjacent the journal bearing.

5 Claims, 2 Drawing Figures

SHAFT SEAL FOR ROTATING PUMPS

CROSS-REFERENCE TO RELATED APPLICATION

The present application is a continuation-in-part of our co-pending application Ser. No. 90,957, filed Nov. 19, 1970, now abandoned, entitled "SHAFT SEAL FOR ROTATING PUMPS" and assigned to the same assignee as the present invention.

BACKGROUND OF THE INVENTION

The present invention relates generally to a rotary pump, and more specifically to a rotary pump of the centrifugal vane type or of the type employing free-floating roller elements disposed in radially extending slots formed in a rotor element. In the centrifugal rotor type pumps, the rotor is normally disposed within a pump housing, the housing having an axis which is offset from either the port axis in the case of centrifugal pumps, or offset from the axis of the rotor in roller pumps. Porting is provided in either type of pump in order to permit movement of fluid through the pump.

In pump structures having the conventional rotor shafts and stationary housings, it has been customary to utilize seals, particularly lip seals, which are designed to provide a seal area or surface between the exterior of the shaft and the bearing housings or other zone to be protected from the fluid being pumped. However, in certain instances, it is desirable to utilize shaft materials which are selected because of the nature of the fluid being pumped, or because of the nature of the remaining components of the pump structure. In such cases, for example, it is frequently necessary to utilize shaft materials of stainless steel, or shafts having surface hardness induced by nitriting, or other surface treatments. Frequently, abnormal wear occurs in the seal because of the nature of the shaft surface, or because of axial misalignment of the shaft. Because machining costs are normally high, it is desirable to eliminate or reduce the machining cost to a practical minimum so as to reduce the overall cost of the product. Hence, the present arrangement makes it possible for the expensive machining operations to be eliminated, and also to permit the shaft surface to be treated by any desirable hardening technique or plating operation.

SUMMARY OF THE INVENTION

Briefly, in accordance with the present invention, the surface of the shaft of a centrifugal or other rotary pump structure is provided with a sleeve element, the sleeve element being in contact with a rotary seal, and with the outer end of the sleeve element being radially outwardly chamfered so as to accommodate an O ring sealing element therewithin. The combined lip seal and O ring seal provide a sealing surface for the pumping chamber, and thus protect the journal bearings from contact with the fluid or fluids being pumped.

Therefore, it is a primary object of the present invention to provide an improved seal means for rotary pump apparatus, wherein the seal means consists essentially of a sealing sleeve which is disposed about the periphery of the drive shaft for the rotary pump structure.

It is yet a further object of the present invention to provide an improved seal means for rotary pump apparatus wherein the seal means includes a sleeve arranged to be disposed coaxially about the rotary drive shaft of the pump apparatus, the sleeve means being provided with a pair of integral resilient seal means about each of the inner and outer peripheral surfaces.

Other and further objects of the present invention will become apparent to those skilled in the art upon a study of the following specification, appended claims and accompanying drawings.

DESCRIPTION OF THE PREFERRED EMBODIMENT

The improved seal means of the present invention is particularly adapted for use in centrifugal type pumps, and particularly roller pumps of the type disclosed and claimed in co-pending application Ser. No. 761,479, filed Sept. 23, 1968, entitled "ROLLER PUMP," now U. S. Pat. No. 3,542,498, this invention being assigned to the same assignee as the present invention.

The seal means of the present invention makes it possible to employ a greater variety of materials for the drive shaft so as to render the pump more economical in production, and more universally adaptable for use with pumped fluids.

Figure 1:
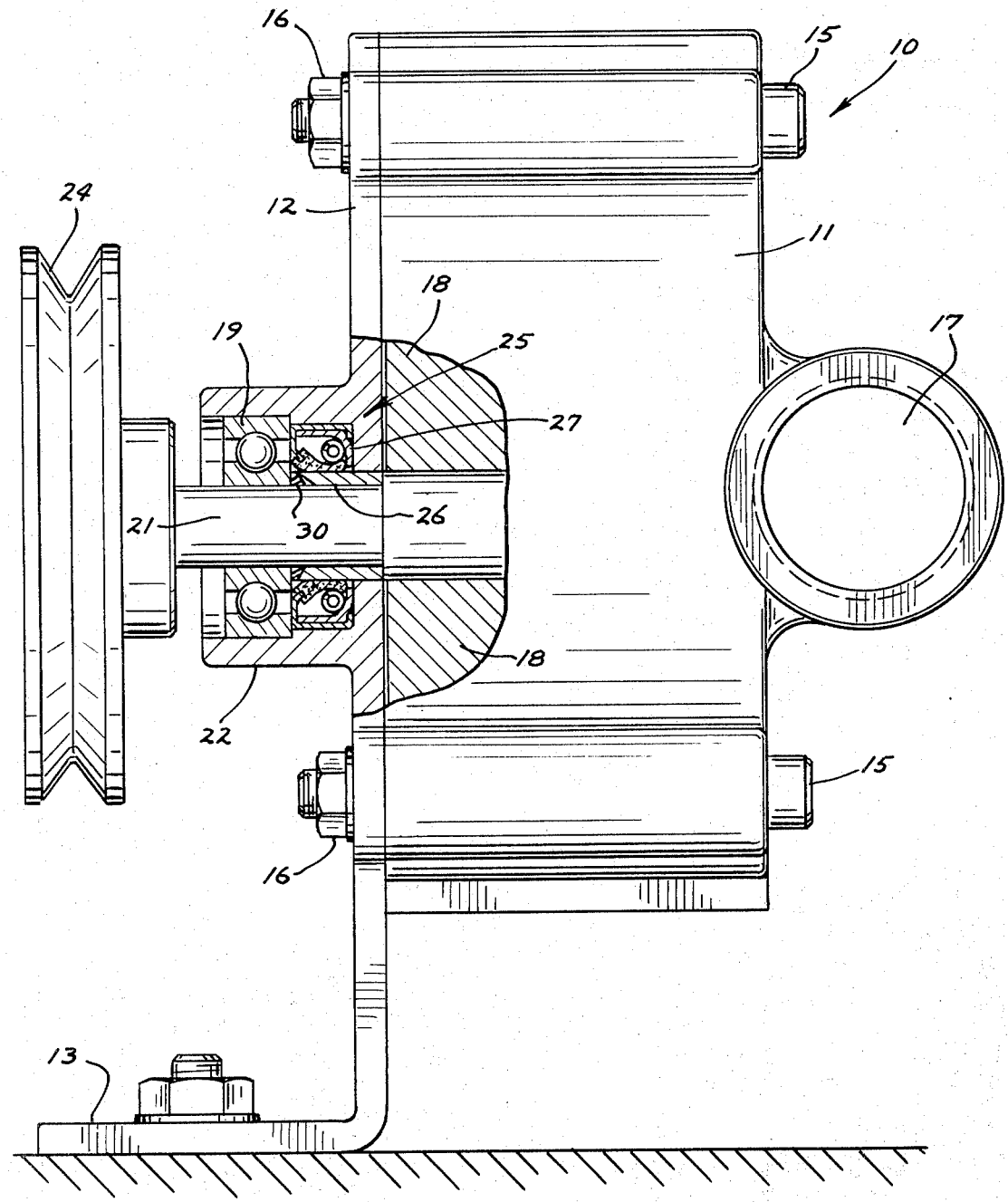
FIG. 1 is a side elevational view of a rotary pump apparatus, FIG. 1 being partially broken away, and showing the improved seal means of the present invention disposed about and adjacent the drive shaft.

In accordance with the showing of FIG. 1, it will be seen that the rotary pump apparatus generally designated 10 includes a housing structure with a drum-shaped body member 11 and an end plate 12, the end plate 12 incorporating a mounting bracket 13 shown coupled to a mounting surface. The housing portion 11 is secured to the housing portion 12 by thru-bolts 15 and nuts 16. The pump is provided with inlet and outlet ports, with the inlet port being shown at 17, the outlet port being arranged in oppositely disposed relationship to the inlet port 17. A rotor element is shown at 18, the rotor being journaled within the bearing member 19, the bearing member 19 being received within the shouldered bearing cavity 20. The pump further includes a drive shaft 21 which is, as indicated, journaled within the bearing 19, the shaft 21 being disposed within bearing retainer 22. A pulley 24 is held fast on shaft 21, pulley 24 being arranged to receive a conventional V-type drive belt.

With attention continuing to be directed to FIG. 1, the sealing arrangement for effectively separating the fluids being pumped from the bearings 19 include a sealing means generally designated 25, this sealing means including a sleeve element 26, a first peripheral resilient seal member 27 and a second resilient seal member 28. Seal 27 is a lip-type seal and arranged to contact the outer surface of the sleeve 26, while seal 28 is preferably an O ring seal. The dimensions of the sleeve are such that the sleeve is held firmly between the rotor 18 and the main bearing 19.

With continued attention being directed to the seal means 25, it will be seen that the sleeve 26 has an outwardly extending chamfer as at 30, this chamfer being formed at one end of the sleeve, and defining a sealing ring retaining cavity for the O ring 28. As the sleeve 26 is held against the bearing 19, the O ring 28 is urged radially inwardly so as to affect a positive seal between the inner surface of the sleeve 26 and the outer surface of shaft 21.

As has been indicated previously, the seal means is particularly adapted for use in the pump structure disclosed and claimed in co-pending application Ser. No. 761,479, filed Sept. 23, 1968, and entitled "ROLLER PUMP," now U. S. Pat. No. 3,542,498. It will be appreciated, of course, that the seal structure is adaptable for a variety of rotary pump apparatus, including vane type centrifugal units, as well as gear pumps and the like.

Figure 2:
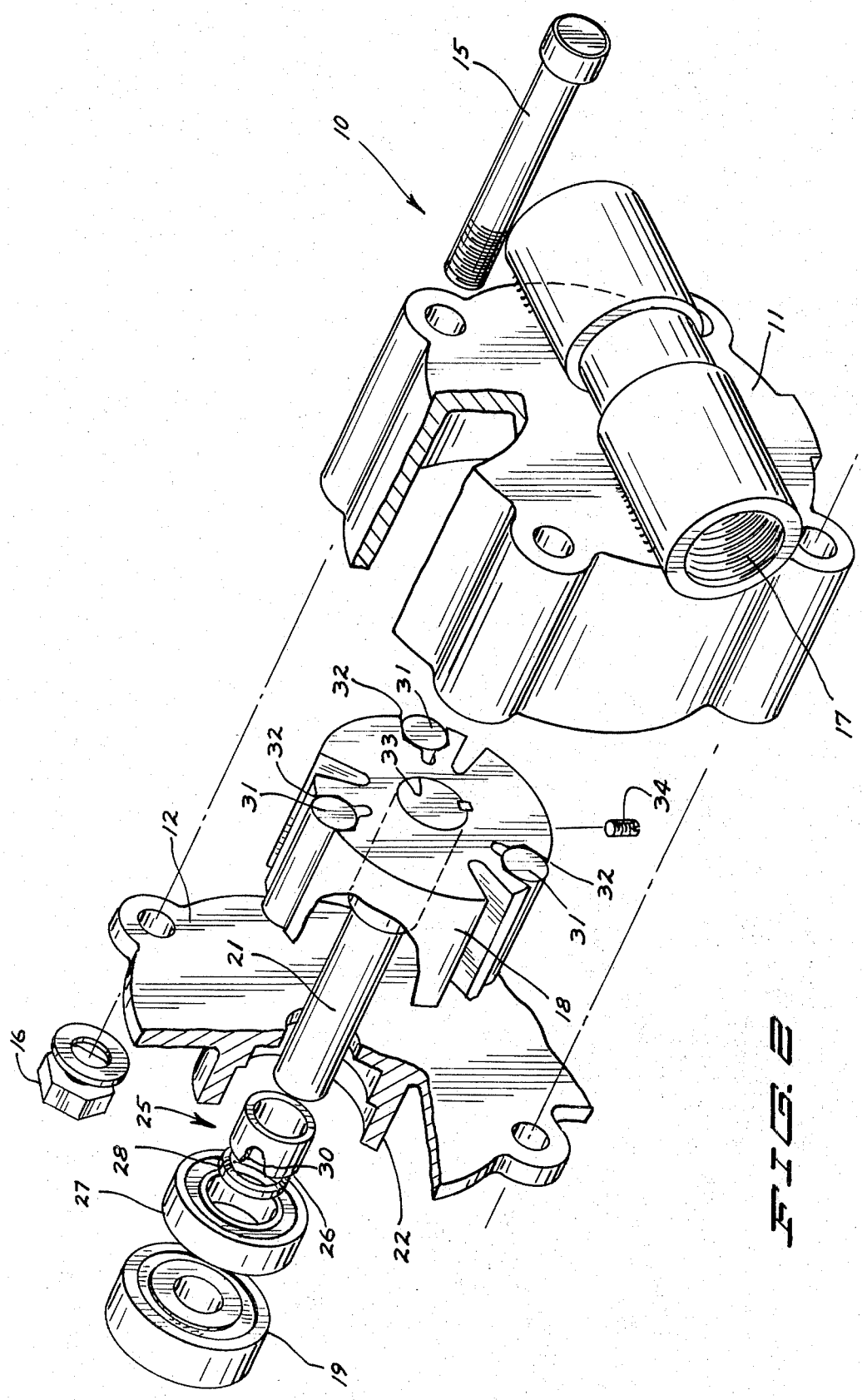
FIG. 2 is an exploded perspective view of the components of a typical roller pump structure utilizing the seal device of the present invention.

With attention being directed to FIG. 2 of the drawings, it will be seen that the structure, in exploded disposition, includes individual roller elements 31—31, these rollers being retained within the confines of roller-receiving slots 32. This view also illustrates the disposition of the outlet port in the housing segment 11, the outlet port being shown at 33. Also, as indicated, set-screw 34 is used to firmly mount and retain rotor element 18 on shaft 21.

It will also be understood and appreciated that a wide variety of lip seals may be utilized for providing a sealing contact between the inner surface of the seal 27 and the outer surface of the sleeve 26. Lip seals of this type are, of course, commercially available.

Although bearing 19 is shown as a single row or race bearing, it will be appreciated that for heavy duty applications, a double row bearing structure should be employed to handle the loading.

We claim:

1. Sealing means for a rotary pump apparatus having a housing, a hub within said housing, and a rotary fluid pumping means including a rotor body and being journaled for rotation within said housing hub, said rotary fluid pumping means including a drive shaft having a collar thereon, and bearing means within said housing for journaling said drive shaft for axial rotation therewithin, said seal means comprising:

a. sleeve means disposed between said rotary fluid pumping means and said bearing means, with the inner peripheral surface of said sleeve means being disposed immediately adjacent to and enclosing the outer periphery of said drive shaft, and having the inner end thereof disposed in abutting relationship to said drive shaft collar and the outer end having an outer peripheral surface in sealing contact with the inner surface of a sealing lip of a first resilient seal means;

b. a radially outwardly extending chamfer formed along the outer end edge surface of said sleeve and extending generally diagonally between said inner and outer peripheral surfaces and defining a concave sealing ring retaining chamfer cavity;

c. a generally toroidally shaped second resilient sealing ring disposed within said chamfer cavity and being in abutting contact with said drive shaft and with the inner edge surface of said bearing means; and d. a first resilient seal means disposed within a cavity formed within said hub and having a sealing lip disposed in sealing contact with the outer peripheral surface of said sleeve means between said inner and outer ends.

2. The seal means as defined in claim 1 being particularly characterized in that said second resilient seal means is an O ring.

3. The seal means as defined in claim 2 being particularly characterized in that said first resilient seal means is a lip seal.

4. The seal means as defined in claim 3 being particularly characterized in that said rotary fluid pump means is a rotor inducing the flow of pumped fluids by centrifugal force.

5. The seal means as defined in claim 3 being particularly characterized in that said rotary fluid pump means is a roller-receiving rotor.

* * * * *